United States Patent [19]

Williams et al.

[11] Patent Number: 4,491,145

[45] Date of Patent: Jan. 1, 1985

[54] TOGGLE GATE VALVE

[75] Inventors: Kenneth R. Williams, Huntington Beach; Mark R. McClaran, Orange; Peter D. Giacobbi, Villa Park, all of Calif.

[73] Assignee: Johnston Pump/General Valve, Inc., Glendora, Calif.

[21] Appl. No.: 410,662

[22] Filed: Aug. 23, 1982

[51] Int. Cl.³ ............................................. F16K 23/00
[52] U.S. Cl. ................................. 137/312; 251/169; 251/203; 137/315
[58] Field of Search ............... 137/312, 315; 251/158, 251/169, 193, 201, 203

[56] References Cited

U.S. PATENT DOCUMENTS

| | | | |
|---|---|---|---|
| 1,707,125 | 3/1929 | Löffler | 251/193 |
| 2,265,175 | 12/1941 | Kinzie | 137/315 |
| 2,614,792 | 10/1952 | Trefil | 251/203 |
| 3,170,668 | 2/1965 | Aulisa | 251/193 X |
| 3,258,243 | 6/1966 | Bryant | 251/193 X |
| 3,768,773 | 10/1973 | Stephens | 251/203 X |
| 4,067,352 | 1/1978 | Halpine | 137/312 |
| 4,314,579 | 2/1982 | Wheatley | 137/312 |

FOREIGN PATENT DOCUMENTS 1118556  7/1958  Fed. Rep. of Germany ...... 251/169

*Primary Examiner*—Harold W. Weakley
*Attorney, Agent, or Firm*—Leonard Tachner

[57] ABSTRACT

A toggle gate valve having a double block and bleed retractable sealing configuration which utilizes accurately positioned steel inserts as trim assembly guide plates to permit a significant reduction in valve body machining. The valve body as well as removable upper and lower bonnets form a pressure boundary that houses a toggle link actuated seal plate to close the valve and a through-conduit that is coaxially aligned with the input and output ports when the valve is opened. A novel stem configuration and removable through-conduit permit field servicing of the trim assembly (plug and seal plate) by means of access through the lower bonnet/body interface.

5 Claims, 8 Drawing Figures

TOGGLE GATE VALVE

BACKGROUND OF THE INVENTION

1. Field of the Invention

The present invention relates to valves and more particularly, to a toggle gate valve that is also suitable for high pressure, high temperature applications and which provides a double block and bleed configuration.

2. Prior Art

Various gate valves that utilize toggle linkages to effect valve opening and closing have been disclosed in the prior art. By way of example, U.S. Pat. No. 1,707,125 to Loffler discloses a gate valve having a toggle linkage connecting a seal plate to an actuator plate. Similarly, U.S. Pat. No. 2,850,260 to Perazone et al discloses a valve having a toggle linkage for forcing the seal plate into a tight closed position. Unfortunately, none of the prior art toggle gate valves known to the applicants comprises a double block and bleed configuration in which the cavity between the seal rings and the sealing surface can be bled to improve the integrity of the seal or can be injected with grease. Furthermore, toggle gate valves are inherently complex and tend therefore to be difficult and costly to manufacture as well as time consuming and costly to service.

SUMMARY OF THE INVENTION

The present invention provides a toggle gate valve configured to overcome the aforementioned disadvantages of the prior art. More specifically, the present invention comprises a double block and bleed configuration and which in addition, utilizes accurately positioned steel inserts comprising guide plates which result in a significant reduction in body cavity machining. Furthermore, the present invention is configured to be fully serviced by removing a lower bonnet and lowering the trim assembly to facilitate inspection or replacement of the seal ring without further disassembly of the valve. A preferred embodiment is designed to provide a double block and bleed configuration to prove tight shut-off. It also provides a grease sealing capability and a through-conduit for use on pipe lines which are frequently cleaned by a flow driven pig. The valve body, upper bonnet and lower bonnet comprise a pressure boundary within which are the trim assembly and guide plates. The guide plates are accurately machined and accurately positioned steel inserts attached to the body and on which the trim assembly slides and rolls. Use of these inserts provides a significant reduction in body cavity machining time. Furthermore, two unique features permit the valve to be fully serviced by merely removing the lower bonnet and lowering the trim assembly through the body/lower bonnet interface opening. These two unique features comprise novel operator stem and jack stem configurations as well as a removable through-conduit as will be more fully understood hereinafter as a result of the detailed description to follow.

OBJECT OF THE INVENTION

It is therefore a principal object of the present invention to provide a novel toggle gate valve which overcomes or substantially reduces the aforementioned disadvantages of the prior art.

It is an additional object of the present invention to provide a toggle gate valve having guide plates comprising accurately positioned steel inserts which result in a significant reduction in body cavity machining.

It is still an additional object of the present invention to provide a toggle gate valve having a sealing plate which is fitted with rollers for use in the toggle link structure to coordinate toggle movement and limit the downward travel of the seal plate.

It is still an additional object of the present invention to provide a toggle gate valve having a configuration producing motion which retracts a seal ring of the seal plate away from the sealing surface of the body to prevent rubbing-induced wear.

It is still an additional object of the present invention to provide a toggle gate valve having a structure in which a cavity between the seal rings and the sealing surface can be bled to prove the integrity of the seal or can be injected with grease.

It is still an additional object of the present invention to provide a toggle gate valve which is more readily serviced with a minimum of time and cost by providing a configuration in which, by removing the lower bonnet, the trim assembly can be lowered to facilitate inspection or replacement of the seal ring without tampering with the operator or further disassembly of the valve.

BRIEF DESCRIPTION OF THE DRAWINGS

The aforementioned advantages and objects of the present invention, as well as additional objects and advantages thereof, will be more fully understood hereinafter as a result of the detailed description of a preferred embodiment of the invention when taken in conjunction with the accompanying drawings in which.

DETAILED DESCRIPTION OF A PREFERRED EMBODIMENT

Figure 1:
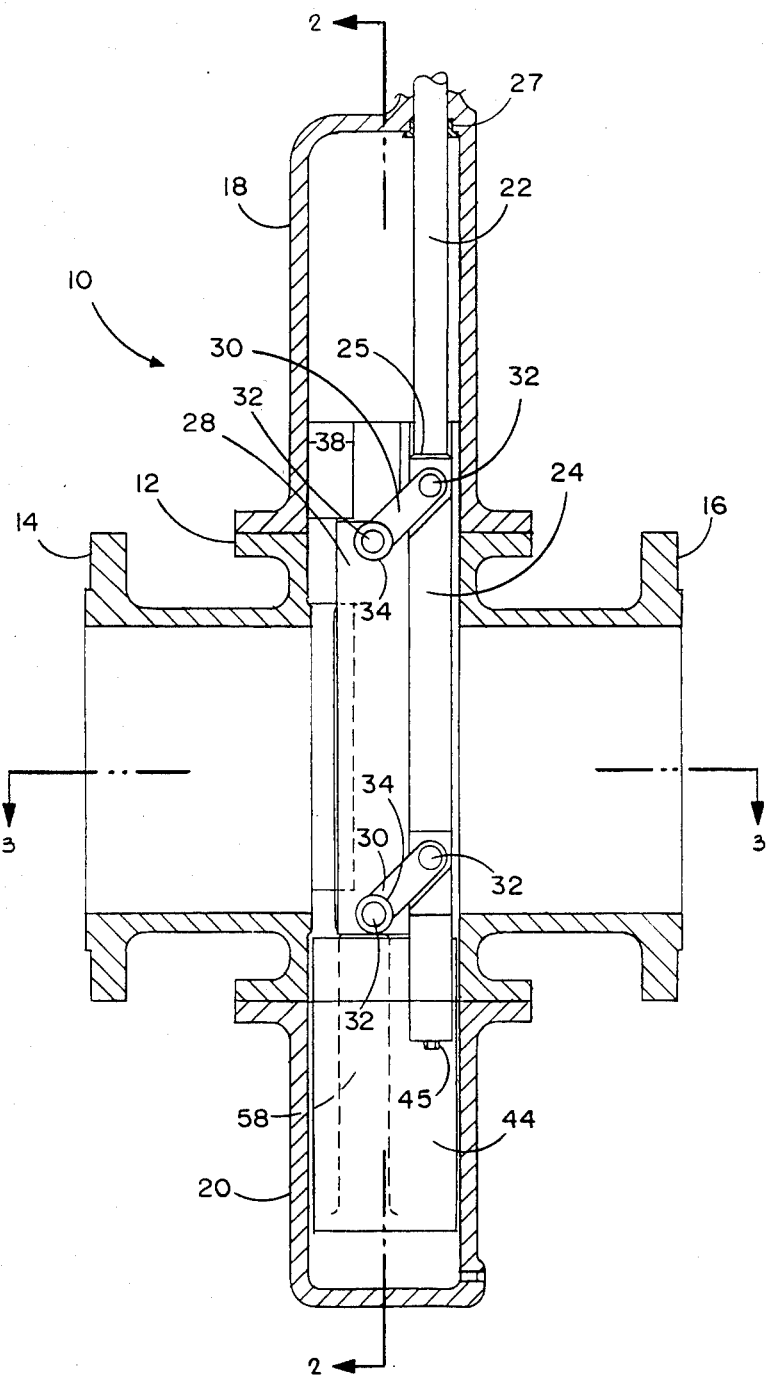
FIG. 1 is a partially sectioned view of the invention illustrating the toggle mechanism.
Figure 2:
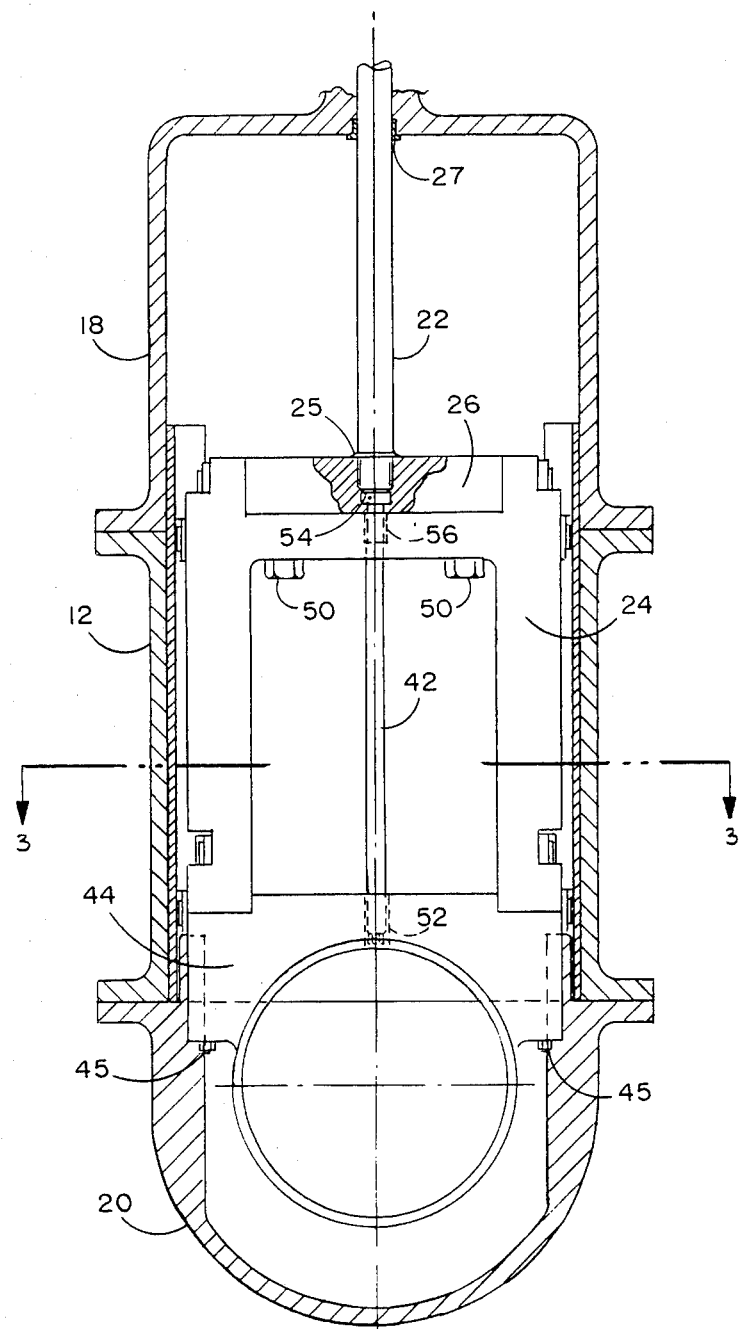
FIG. 2 is a partially sectioned side view of the invention taken along lines 2—2 of FIG. 1.
Figure 3:
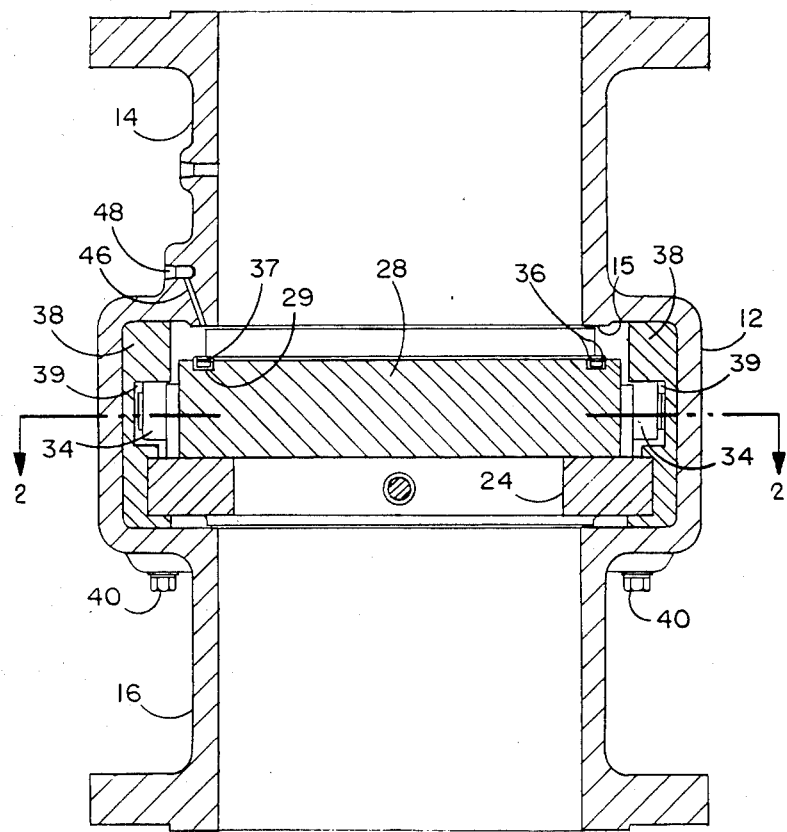
FIG. 3 is a sectional top view of the invention taken along lines 3—3 of FIG. 1.

Referring concurrently to FIGS. 1, 2 and 3, it will be seen that the toggle gate valve 10 of the present invention comprises a valve body 12 having an inlet port 14 and an outlet port 16. Connected to the valve body 12 at its upper and lower ends respectively, are upper bonnet 18 and lower bonnet 20. Extending through the upper bonnet 18 is an operator stem 22 which is connected to the top central portion of a generally U-shaped plug 24 by means of a stem coupling 26. Plug 24 comprises a portion of the trim assembly which also comprises a seal plate 28 which is connected to the plug at four locations by means of toggle links 30 and mounting pins 32. Seal plate 28 is fitted with rollers 34 outboard of the toggle links 30 on the same mounting pins 32. During their vertical motion with the opening and closing of valve 10, rollers 34 travel within vertical guide plate slots 39 in guide plates 38.

Seal plate 28 is rectangular in shape and has an annular groove 29 along the periphery thereof in which a double beaded resilient seal ring 36 resides and which provides a sure seal against the inlet pressure by being forced against the interior surface 15 of the inlet port 14 when the valve is in its fully closed position.

It will be seen hereinafter that the interaction of plug 24 and seal plate 28 by means of toggle links 30 as controlled by the relative position of rollers 34 within guide plate slots 39, assures that the seal ring 36 and the seal plate 28 in which it resides are pulled horizontally by the toggles until the back surface of the seal plate contacts the plug. This motion retracts the seal ring of the seal plate away from the sealing surface of the body when a fully closed valve is being opened, thereby preventing any rubbing-induced wear on the surfaces of the trim assembly and body.

Guide plate adjustment screws 40 are provided to permit external adjustment of the guide plates to assure proper spacing relationships between the components of the trim assembly during manufacture and to provide a means for compensating for guide plate and roller wear during maintenance of the valve without requiring disassembly.

A pair of retention bolts 45 interconnect the plug 24 with a through-conduit 44 which is housed within the lower bonnet 20 when the valve is in the closed position and which is drawn up into coaxial alignment with the inlet and outlet ports when the valve is in the open position as will be hereinafter more fully disclosed.

Figure 4:
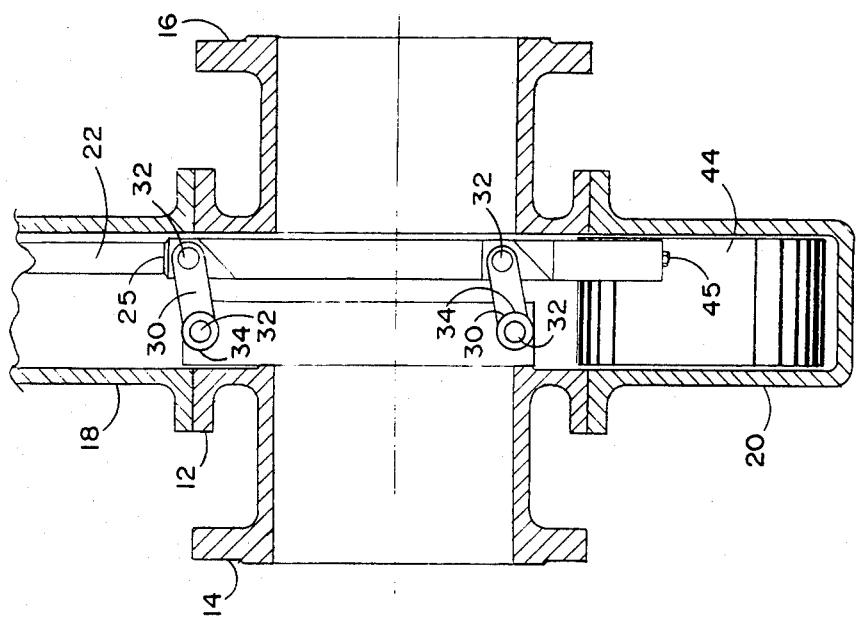

From the fully closed position, as the stem, plug and through-conduit are raised vertically, the seal plate's motion is limited by the guide plates. The seal plate is pulled horizontally by the toggle links until the back surface of the seal plate contacts the plug. This horizontal motion may be observed by comparing FIGS. 4 and 5 wherein FIG. 4 illustrates the valve of the present invention in the fully closed position with the seal plate 28 maximally separated from the plug 24 by the action of toggle links 30. In the position of the valve as indicated in FIG. 4, the seal plate 28 is fully seated against the interior surface 15 of the inlet port 14 of the valve body 12 thereby fully pressuring the seal ring 36 against the inlet.

Figure 5:
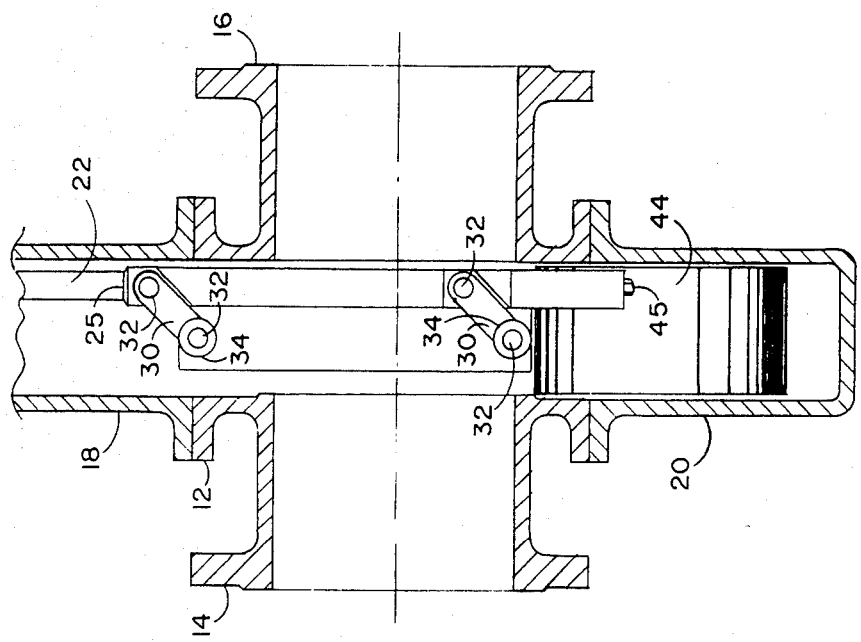
FIGS. 4 through 7 are partially sectioned views of the invention sequentially illustrating the opening and closing operation of the invention.

In comparison, one may see that in the unseated configuration of the valve of the present invention as illustrated in FIG. 5, the operator stem 22 and plug 24 have been raised vertically a sufficient distance to change the angle of toggle links 30 with respect to the horizontal, thereby pulling seal plate 28 horizontally away from the inlet port and into contact with the plug. Therefore, in the position of the valve shown in FIG. 5, the seal plate has been unseated from the inlet port due to the horizontal motion imparted by the operator stem and plug acting through the toggle links. During this horizontal motion reflected in the comparison of the configurations of the valve illustrated in FIGS. 4 and 5, respectively, the seal plate's vertical motion is regulated by contact between the rollers 34 and the guide plate slots 39 of guide plates 38.

When the horizontal travel is complete is represented by the configuration illustrated in FIG. 5, the entire trim assembly comprising the combination of the plug 24 and seal plate 28, joined by the toggle links 30, rises into the upper bonnet 18 until the through-conduit 44 is aligned between the inlet and outlet ports 14 and 16, respectively, of the valve body 12. The vertical motion of the plug 24 and through-conduit 44 is guided by the slots 39 in guide plates 38.

Figure 7:
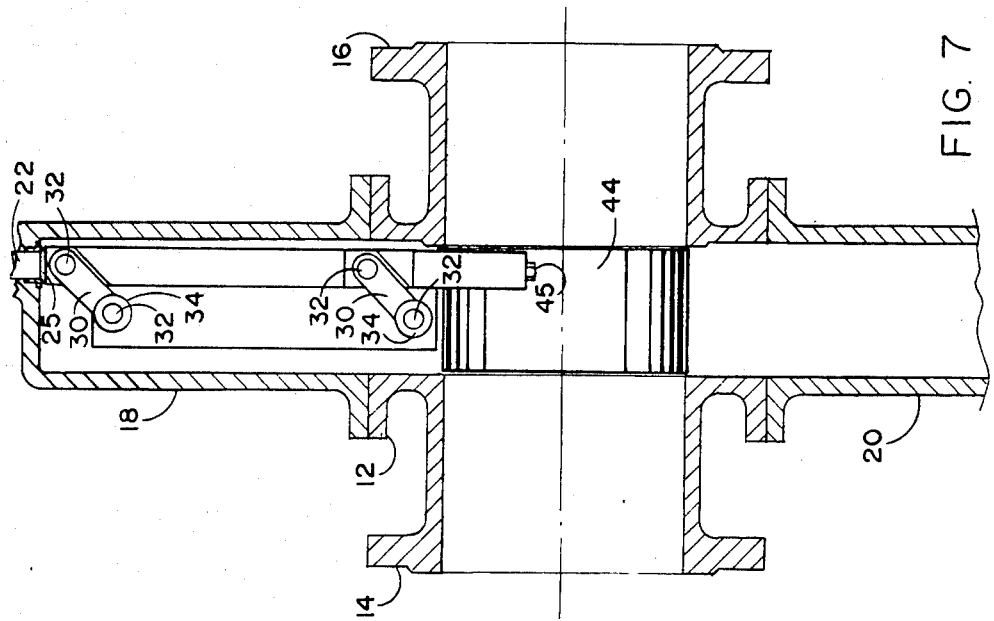
Figure 6:
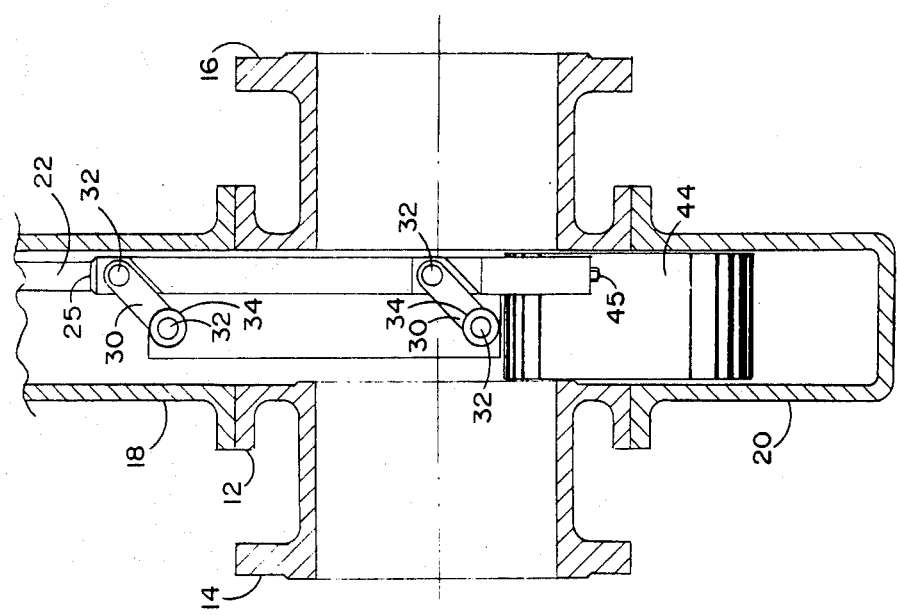

The vertical motion of the trim assembly within the valve 10 during opening of the valve may be better understood by reference to FIGS. 6 and 7. FIG. 6 illustrates the valve in a partially open position in which the trim assembly has begun its vertical motion pulling the through-conduit 44 partially up and out of the lower bonnet 20. FIG. 7 illustrates the valve configuration when the trim assembly, that is, the plug 24 and seal plate 28, have been pulled completely into the upper bonnet until a stem shoulder 25 of operator stem 22 has come into contact with a stem backseat bushing 27 at the uppermost portion of upper bonnet 18. It will be seen in FIG. 7 that in this configuration the through-conduit 44 has been completely aligned coaxially with the inlet and output ports 14 and 16, respectively, within the valve body 12.

It will be understood that closing of the valve involves operation in a sequence opposite from that described with reference to FIGS. 4 through 7, respectively. More specifically, from the fully opened position the plug 24 and the seal plate 28 are moved downwardly from the upper bonnet into the valve body with the seal plate experiencing only vertical motion. Downward vertical motion is limited when the two lower rollers 34 contact a pair of seal plate stops 58 affixed to the sides of the lower bonnet and protruding into the body cavity to limit the downward travel of the seal plate. At that point in time, further downward travel of the plug 24 is translated into horizontal motion of the seal plate 28 by the toggle links 30. This horizontal motion continues until the double-beaded seal ring 36 is again forced against the internal sealing surface 15 of the inlet 14 thereby effecting a double block.

Figure 8:
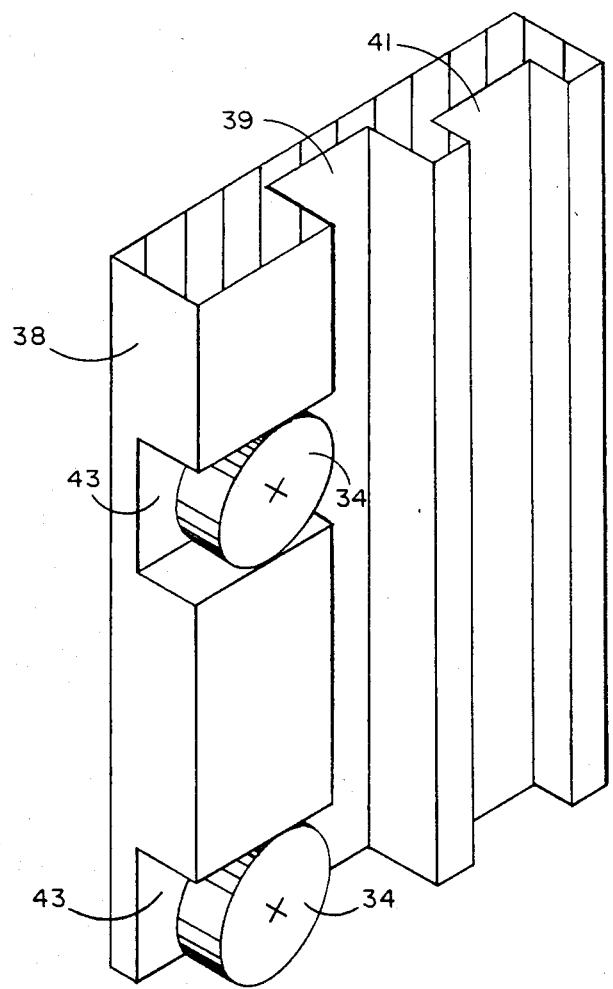
FIG. 8 is an isometric view of a guide plate of the present invention.

A more detailed description of guide plates 38 will now be provided in conjunction with FIG. 8. More specifically, as seen in FIG. 8, each guide plate comprises a substantially rectangular body having a number of vertical and horizontal slots. Guide plate slot 39 is a vertical coordinating slot for rollers 34 while guide plate slots 43 are horizontal coordinating slots for rollers 34. In addition, a plug guide slot 41 is provided to accommodate plug 24 in its vertical motion during opening and closing of the valve.

As seen in FIG. 8, the rollers 34 are near their seated position (FIG. 4) in the horizontal coordinating roller slots 43. Upon further opening of valve 10, rollers 34 will be positioned in vertical slots 39 whereupon vertical movement of seal plate 28 and plug 24 will be effected.

The annular cavity between the respective beads of the double-beaded seal ring 36 can be bled while the seal ring is pressed against the inner surface 15 of the inlet port. This bleeding capability is provided to allow the user to prove the integrity of the seal. Alternatively, this annular cavity may be injected with grease in accordance with the user's desires. The cavity can be bled by means of a bleed passage 46 and bleed hole 48 shown on the left side of FIG. 3. It will be understood that when the valve is again in its fully closed position after the reversed sequence, (FIG. 7 through FIG. 4, respectively), has been completed, the through-conduit 44 is again housed in the lower bonnet as illustrated in the seated configuration of the valve of FIG. 4.

A particularly advantageous, novel feature of the present invention pertains to obtaining access for servicing the valve by means of the lower bonnet. More specifically, the toggle gate valve 10 of the present invention can be fully serviced by removal of the lower bonnet and lowering of the trim assembly through the lower bonnet interface opening in the valve body 12. Two unique features of the invention facilitate this advantageous servicing capability. More specifically, as seen best in FIG. 2, the operator stem 22 is connected to the plug 24 by means of the stem coupling 26 into which the operator stem 22 is threaded. The plug is bolted to the coupling by means of a pair of coupling bolts 50. After the lower bonnet has been removed, the through-conduit 44 is removed by removal of its two retaining bolts 45. When the two plug coupling bolts 50 are removed, the weight of the plug and seal plate assembly is held by the jack stem 42. The plug 24 and seal plate 28 can then be lowered by rotation of the jack stem 42. The jack stem is a threaded rod with a hex head cut on its lower end which usually resides in a clearance hole 52 in the upper portion of through-conduit 44 as seen in FIG. 2. Jack stem 42 also comprises a flat, enlarged diameter portion 54 at its upper end which is held captive in the stem coupling 26 from which the jack stem and the plug seal plate assembly hang after the coupling bolts 50 have been removed. A passage 56 in plug 24, and through which jack stem 42 passes, is threaded. Therefore, when the jack stem is rotated from the lower end by access through the lower bonnet aperture, (the lower bonnet being removed), the plug/seal plate combination will be raised or lowered according to the direction of rotation of the jack stem. Therefore, by appropriate rotation of the jack stem, the seal ring can be lowered sufficiently below the valve body to be inspected or replaced with no further disassembly of the valve. This feature is particularly advantageous from the standpoint of maintenance or repair of the sealing ring and seal plate because it substantially reduces the time required to inspect or repair those components of the valve. As a result, a considerable cost savings to the user may be effected by the present invention.

It will now be understood that what has been disclosed herein comprises a unique double block and bleed toggle gate valve which is easier and less costly to manufacture and service. A novel guide plate-toggle link roller assembly permits accurate motion of the trim assembly without requiring time-consuming special machining to achieve dimensional precision. Furthermore, a unique servicing feature is provided to permit easy access to the seal plate and seal ring for inspection or repair by simply removing the lower bonnet, through-conduit and plug retention bolts and rotating the jack stem.

Although a particular preferred embodiment has been disclosed, those having skill in the valve art will perceive of various modifications and additions. By way of example, numerous variations in valve geometry may now occur. However, all such modifications and additions are contemplated as being within the scope of the invention which is to be limited only by the appended claims.

We claim:

1. A gate valve comprising:
   a valve body having axially aligned inlet and outlet ports for connection to respective upstream and downstream pipes,
   upper and lower bonnets connected to said valve body on opposing sides thereof and substantially orthogonal with respect to said inlet and outlet ports to form a pressure boundary,
   a trim assembly housed within said pressure boundary and having a plug and a seal plate in substantially parallel relation and interconnected by a plurality of toggle links for permitting limited relative motion therebetween,
   a through-conduit connected to the lower end of said plug and an operator stem connected to the upper end of said plug,
   said lower bonnet having at least one seal plate stop extending into said valve body for limiting the downward vertical travel of said seal plate,
   the closed configuration of said valve having said seal plate maximally separated from said plug and being pressed against said inlet port by said toggle links, and having said through-conduit substantially within said lower bonnet,
   the opened configuration of said valve having said seal plate retracted into engagement with said plug, having said seal plate and plug substantially within said upper bonnet, and having said through-conduit positioned in substantial coaxial alignment with said inlet and outlet ports,
   rollers connected to said seal plate adjacent said toggle links, and guide plates connected to said valve body for limiting the motion of said rollers and said seal plate during opening and closing of said valve, and
   a stem coupling and a threaded jack stem, the stem coupling interconnecting said operator stem and said plug and supporting said jack stem in fixed rotational engagement therewith, said jack stem extending through a matching threaded hole in said plug, and means for lowering said plug and seal plate out of said valve body for inspection or repair upon removal of said lower bonnet and disconnection of said through-conduit and said stem coupling from said plug.

2. The gate valve recited in claim 1 further comprising a resilient annular seal ring attached to the face of said seal plate for being pressed against said inlet port when said valve is in said closed configuration.

3. The gate valve recited in claim 2 wherein said seal ring comprises at least two annular spaced beads and wherein said inlet port comprises a bleed hole extending from the exterior of said valve to the interior of said inlet port between said beads when said valve is in a closed configuration, whereby the sealing integrity of said valve may be tested while said valve is closed.

4. The gate valve recited in claim 1 wherein the motion of said seal plate is initially limited by said guide plates to be parallel to the direction of flow when the closed valve is being opened whereby said seal plate is first retracted away from said inlet port to prevent rubbing-induced wear.

5. The gate valve recited in claim 1 further comprising means external of said valve body for adjusting the position of said guide plates during assembly and maintenance.

* * * * *